(12) United States Patent
Jeran

(10) Patent No.: US 6,954,753 B1
(45) Date of Patent: Oct. 11, 2005

(54) TRANSPARENT ELECTRONIC SAFETY DEPOSIT BOX

(75) Inventor: Paul L Jeran, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/421,919

(22) Filed: Oct. 20, 1999

(51) Int. Cl.[7] .............................................. G06F 17/30
(52) U.S. Cl. ..................... 707/10; 707/1; 707/104.1; 709/219
(58) Field of Search ....................... 713/1, 168, 200, 713/201, 185, 171, 172; 705/42, 78; 707/10, 707/104.1; 711/113, 111, 148, 153; 709/219, 709/204, 225, 207

(56) References Cited

U.S. PATENT DOCUMENTS

| | | | | |
|---|---|---|---|---|
| 5,321,816 A | * | 6/1994 | Rogan et al. .................. | 705/42 |
| 5,388,260 A | | 2/1995 | Monahan et al. ............... | 711/1 |
| 5,495,607 A | * | 2/1996 | Pisello et al. .................. | 707/10 |
| 5,546,557 A | * | 8/1996 | Allen et al. ................... | 711/111 |
| 5,671,285 A | * | 9/1997 | Newman ....................... | 705/78 |
| 5,892,900 A | | 4/1999 | Glinter et al. ............... | 713/200 |
| 6,067,618 A | * | 5/2000 | Weber ........................... | 713/1 |
| 6,314,500 B1 | * | 11/2001 | Rose ........................... | 711/148 |
| 6,351,813 B1 | * | 2/2002 | Mooney et al. ............. | 713/185 |
| 6,356,941 B1 | * | 3/2002 | Cohen ........................ | 713/168 |
| 6,370,614 B1 | * | 4/2002 | Teoman et al. ............. | 711/113 |
| 6,427,032 B1 | * | 7/2002 | Irons et al. .............. | 707/104.1 |
| 6,584,466 B1 | * | 6/2003 | Serbinis et al. ............... | 707/10 |

* cited by examiner

Primary Examiner—Charles Rones
Assistant Examiner—Hassan Mahmoudi
(74) Attorney, Agent, or Firm—Leslie G. Murray

(57) ABSTRACT

A secure electronic storage system for digital information administered by a third party and accessible over a communications network. Sensitive information in digital format is stored in a secure database located at a physically remote storage facility which appears to a client computer as a single, peripheral storage device and is transparent to the user. The secure storage facility is treated as a local logical storage device accessible from a user's desktop computer thus allowing the storage, retrieval and updating of data files electronically over a communications network such as the internet. Dedicated data storage units identified by a user identification code are maintained in a secure environment and are accessed from a user's desktop computer utilizing a standard data file access method for a single peripheral storage device. Encryption and user authorization validation services are also provided.

35 Claims, 4 Drawing Sheets d:\user ID\path 1\path 2\ · · · filename.doc
 40    42        44              46

Fig. 2

TRANSPARENT ELECTRONIC SAFETY DEPOSIT BOX

FIELD OF THE INVENTION

The present invention relates generally to storage of digital data in a secure database, and, more particularly, to the storage of digital data in a secure database at a remote storage facility which appears to a host system and end user as a single, peripheral storage device.

BACKGROUND OF THE INVENTION

The storage, distribution and safeguarding of valuable and proprietary information presents special and difficult problems. Traditionally, devices such as the safety deposit box, for example, have been used for secure storage of both personal and commercial information and other valuable materials. The safety deposit box provides security in the sense that it is physically located in a secure vault having limited access, and at least two keys, one in the possession of the vault administers and one in the possession of the user, are required for access to the safety deposit box.

Today, virtually anything that can be represented by words, numbers, graphics, or system of commands and instructions can be formatted into electronic digital information. Typically, a user could back up critical files or documents to a portable storage medium and then transport the data to a secure storage facility, such as safety deposit box or the like. This involves transportation to and from the facility and physical storage of the files in multiple formats, which may or may not become obsolete by the time it is required to recover the data. Additionally, if it is desired to update the data, the data must first be physically retrieved from the storage facility and then physically replaced at the storage facility when any updates are complete.

A common example is the software escrow account. Software customers sometimes request that program source code and design documentation be placed into an escrow account for safe keeping. The software customer desires some assurance that the software will survive the demise of the vendor organization (or the departure of key personnel) that developed the software. On the other hand, software source code and design documentation are the crown jewels, the pattern or template from which unlimited quantities of saleable product can be manufactured and vendors typically are very reluctant to provide copies of this material to their customers.

Escrow arrangements, however, suffer from several weaknesses, some of them almost intractable. In addition to the problems generally associated with safety deposit boxes, escrow arrangements are not cheap to set up or to maintain. The escrow materials must be updated periodically—an administrative headache where a third-party escrow agent is involved.

In some situations a software owner's concerns about unauthorized access might be satisfactorily addressed by providing encrypted source code and design documentation to a customer. The code and a decryption key could be given to a high-level official of the customer along with contract documents including specific safekeeping requirements (e.g., mandating the use of an off-site safety deposit box) as well as instructions to release the decryption key only in specified circumstances. A double-encryption scheme could also be employed. However, encryption is no more a panacea than the escrow account. In addition to the above described problems associated with escrow accounts, a customer might be too small a company for such an encryption scheme to be workable or the software vendor may not have any basis for trusting any of the officials of the customer.

Traditional electronic information protection systems are often inflexible and inefficient, and, further, are vulnerable to unauthorized access. Authorization passwords and protocols, license servers, "lock/unlock" distribution methods, and non-electronic contractual limitations imposed on users are a few of the more prevalent protection schemes. In a business and commercial context, these efforts are inefficient and limited solutions.

Accordingly there is a need for a way to securely store digital information, whether it be a company's critical business records or software source code, for example, without the attendant limitations and disadvantages described above.

SUMMARY OF THE INVENTION

In a preferred embodiment, the present invention provides secure storage for sensitive information in digital format administered by a third party which is transparent to the user. The storage facility is treated as a local logical storage device accessible from a user's desktop computer thus allowing storage, retrieval and updating of data files providing flexibility and efficiency without the requirement to physically transport the information to and from the storage facility.

An embodiment of a secure data storage system according to the principles of the present invention includes one or more client computers coupled by a communications network to a remotely located secure storage facility. The remote secure storage facility is identified by an address on the communications network and includes one or more dedicated data storage units for storing data files, a processor for handling all internal management of the secure storage facility functions including management of the dedicated data storage units, and encryption/decryption keys to encrypt the stored data files in accordance with user instructions. The processor also supports communications with client computers and other devices on the network via a network address for the secure storage facility. Each dedicated data storage unit in the secure storage facility is identified with a user identification code. The secure storage facility includes memory to store instructions provided by users for managing access to dedicated data storage units assigned to each user.

At the client computer, the dedicated data storage unit assigned to a user is represented as a logical storage device. Thus a standard file access method for a single peripheral storage device may be used to request access to the dedicated data storage unit. The path format is the same as that for a single, peripheral storage device except that the peripheral storage device designator is replaced with a designator for the remote secure storage facility and a user identification code designating a particular dedicated data storage unit is inserted as a path element. In a preferred embodiment, the logical storage device is a controller which, in response to a user request for access to the logical storage device, sets up an automatic connection with the remote secure storage facility indicated by the designator provided in the path format. When communications with the remote storage facility have been established, the controller transmits the access request to the remote secure storage facility, and, when user access to the dedicated data storage unit identified by the user identification code provided by the path format has been granted, the controller provides access to the dedicated data storage unit by routing communications between the client computer and the remote secure storage facility, the client computer and the user being unaware that it is in communication with the remote secure storage facility.

In another preferred embodiment, the logical storage device may include encryption and decryption keys to provide a single level of encryption in addition to that provided at the remote secure storage facility. User data files to be stored on the dedicated data storage unit are encrypted in accordance with a user assigned security level.

The present invention may also be implemented as a method of accessing a secure data storage unit that utilizes the apparatus described above. The method preferably includes initiating a request for access to a dedicated data storage unit, the request specifying the remotely located secure storage facility containing the dedicated data storage unit for which access to is desired and a user identification code designating the desired dedicated data storage unit. In response to the request for access, determining the remote secure storage facility address on a communications network, automatically connecting to the remote secure storage facility, and transmitting the request to the remote secure storage facility. Identifying the dedicated data storage unit associated with the specified user identification code and granting access to the identified dedicated data storage unit in accordance with pre-existing instructions associated with the specified user identification code. The preferred, method may also include specifying a processor identification code associated with the client computer and identifying the dedicated data storage unit associated with both the specified user identification code and the specified processor identification code.

Other aspects and advantages of the present invention will become apparent from the following detailed description, taken in conjunction with the accompanying drawings, illustrating by way of example the principles of the invention. The claims alone, not the preceding summary or the following detailed description, define the invention.

BRIEF DESCRIPTION OF THE DRAWINGS

The present invention will be described with reference to the accompanying drawings. The components in the drawings are not necessarily to scale, emphasis instead being placed upon clearly illustrating the principles of the present invention. In the drawings, like reference numbers indicate identical or functionally similar elements throughout the several views.

FIG. 2 is a sample path specification for a document in the secure document storage system of FIG. 1;

DETAILED DESCRIPTION OF THE INVENTION

Figure 1:
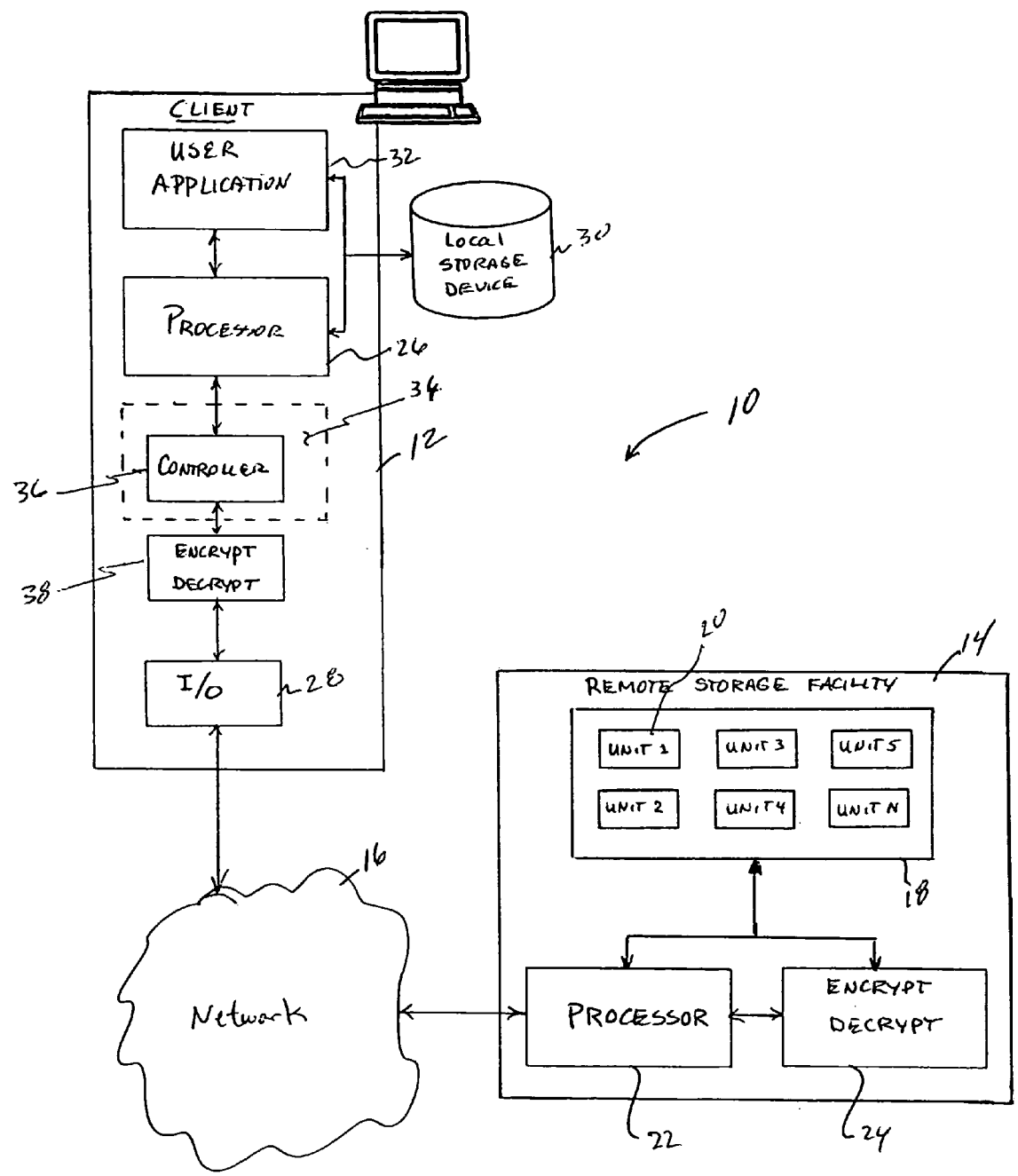
FIG. 1 is a simplified block diagram of a computer system implementing one embodiment of a secure document storage system according to the principles of the present invention.

As shown in the drawings for purposes of illustration, the present invention is preferably embodied in a data storage system for storing sensitive digital information in a secure environment administered by a third party and accessible electronically over a communications network. Conventional systems for the secure storage of sensitive information such as the traditional safety deposit box, for example, while adequate for the storage of physical items, have proven to be inefficient and somewhat limited for the storage of digital information in many cases, such as an escrow arrangement, for example.

A data storage system according to the present invention includes a dedicated data storage unit maintained at a remote secure storage facility and is presented to the user as a local logical storage device accessible from a desktop computer, for example. The dedicated data storage unit may be accessed utilizing a standard data file access method for a single peripheral storage device and is thus transparent to the user thus allowing storage, retrieval and updating of data files providing flexibility and efficiency without the requirement to physically transport the information to and from the storage facility.

Referring now to FIG. 1, a preferred embodiment of a secure data storage system 10 according to the principles of the present invention is shown. The secure data storage system 10 includes a client computer 12 coupled to a remotely located secure storage facility 14 by a communications network 16, such as the World Wide Web (the internet), a local area network (LAN) or a wide area network (WAN), for example. The remote secure storage facility 14 is located at an address on the communications network 16 and is capable of two-way communications with the client computer 12 and other computers and devices (not shown) on the network 16 in the conventional manner. While the remote secure storage facility 14 may be operated and supported by an entity for its members, the remote secure storage facility is generally operated by a separate entity (i.e., an entity separate with respect to the client computer 12 and a user of the client computer 12) offering secure data storage services on a commercial basis. A user desiring such secure data storage services would subscribe to the service much in the same manner as a user subscribes to other internet services. The secure storage facility 14 would provide the necessary instruction package to enable a user's computer, client computer 12, for example, to use the service in the form of software such as on a portable magnetic disk or CDROM, for example, or firmware in the form of a chip or insertable card, for example.

The remote secure storage facility 14 includes a mass storage module 18 containing a plurality of dedicated data storage units 20 for storing user data files in a controlled and secure environment. Each dedicated data storage unit 20 is identified by an identification code (ID code) and is assigned to a user. A user is, preferably, assigned a user identification code (user ID code) which is the identification code for the assigned dedicated data storage unit 20. In a preferred embodiment, each dedicated data storage unit 20 may be identified by one or more identification codes; each identification code, however, is assigned to only one dedicated data storage unit 20. Each identification code identifying a single dedicated data storage unit may have a different level of functionality or security associated with it. For example, a dedicated data storage unit 20 may be assigned to one user and identified (for that user) with an ID code allowing only read-only access, while a second user may have a different identification code for the same dedicated data storage unit which could allow both read and write access.

The mass storage module 18 may be any suitable electronic data storage means and may include, for example, magnetic media, optical media, combined magneto-optical systems, and/or other memory storage means such as large capacity optical storage systems employing holographic, frequency, and/or polarity data storage techniques. For example, mass storage module 18 may be a storage library employing a plurality of magnetic disk storage devices, magnetic tape devices or optical disc devices as is known in the art.

The remote secure storage facility 14 also includes a system processor 22 and encryption/decryption keys 24. The system processor 22 may be a personal computer, a workstation or a mainframe processor or midrange computer. In a preferred embodiment, the system process 22 is a personal computer including main memory and one or more storage media, such as those in fixed or floppy disk drives. The system processor 22 is coupled to the mass storage module 18 and to the encryption/decryption keys 24 and generally supports the secure storage facility 14 functions such as creating and deleting data files, writing to and reading from the data files, maintaining communications between the secure storage facility 14 and the client computer 12 and other devices on the network 16, maintaining tables of dedicated data storage unit identification codes and users assigned to the dedicated data storage units 20, maintaining sets of usage and security instructions associated with each of the various identification codes, user validation, and granting user access to an assigned dedicated data storage unit 20 in accordance with the set of instructions associated with the particular identification code, for example. The system processor 22 also controls the encryption/decryption keys to encrypt or decrypt user data files in accordance with the security instructions associated with a particular user identification code.

The client computer 12 may be a mainframe or midrange computer servicing one or several users or a personal or workstation computer with one user. In a preferred embodiment, client computer 12 is a personal computer including a processor 26, input/output means coupled to the communications network 16, encryption/decryption keys 38 and one or more storage devices 30 such as a magnetic disk drive and/or a CDROM drive, for example. The processor 26 and storage device 30 support one or more user applications 32 such as word processing and/or spread sheet applications, for example.

The remote secure storage facility 14 is defined as a logical storage device 34 within the environment of the client computer 12 coupled to the processor 26, the encryption/decryption keys 38 and the input/output means 28. In a preferred embodiment, the logical storage device 34 includes a controller 36 which determines the remote secure storage facility 14 network address (based on an access request as explained in more detail below) and maintains a directory for the logical storage device 34 as well as initiating and supporting communications between the client computer 12 and the remote secure storage facility 14. The designator for the logical storage device 34 is essentially a designator for the remote secure storage facility 14 and is analogous to a designator for a single, peripheral storage device and a dedicated data storage unit 20 appears as a subdirectory for that storage device.

Standard path protocol known in the personal computer environment is used to access data files in the remote secure storage facility 14. As shown in FIG. 2, the path format includes path elements 40, 42, 44 and 46. Of the path elements, "d:" 40 is the designator for the remote secure storage facility 14 (represented by the logical storage device 34), "user ID" 42 is the identification code for a dedicated data storage unit 20, "path1\path2" 44 is the normal subdirectory path and "filename.doc" 46 is the filename and extension. The designator for the remote secure storage facility 14 is a letter and a colon as is conventionally used for any peripheral storage device in the personal computer environment, such as the commonly used "c:" for a fixed disk drive. The user ID 42 appears as a subdirectory element in the root directory of the designated hardware. Because the first apparent subdirectory element is actually the identifier for a dedicated data storage unit 20 and the remaining subdirectory elements 44 are the actual path, the remote secure storage facility 14 appears to the client computer 12 as does any single, peripheral storage device.

With continuing reference to FIGS. 1 and 2, the remote secure storage facility 14 requires no instruction as to the physical location of a dedicated data storage unit 20. Upon receipt of a user-initiated access request for the logical storage device 34, controller 36 automatically initiates and establishes communications with the remote secure storage facility 14 and transmits the access request to the remote secure storage facility 14. Controller 36 determines the remote secure storage facility 14 network address as a function of the remote secure storage facility designator 40. If more than one remote secure storage facility 14 is available for use, the logical storage device 34 can be assigned multiple designators 40, each designator corresponding to a different remote secure storage facility having an associated network address. The system processor 22 determines the particular dedicated data storage unit 20 and its location based on the user ID 42 and directs the appropriate actions in accordance with a received access request. Thus, management and control of the remote secure storage facility 14 and the dedicated data storage unit 20 is transparent to the client computer 12 and the user.

Figure 3:
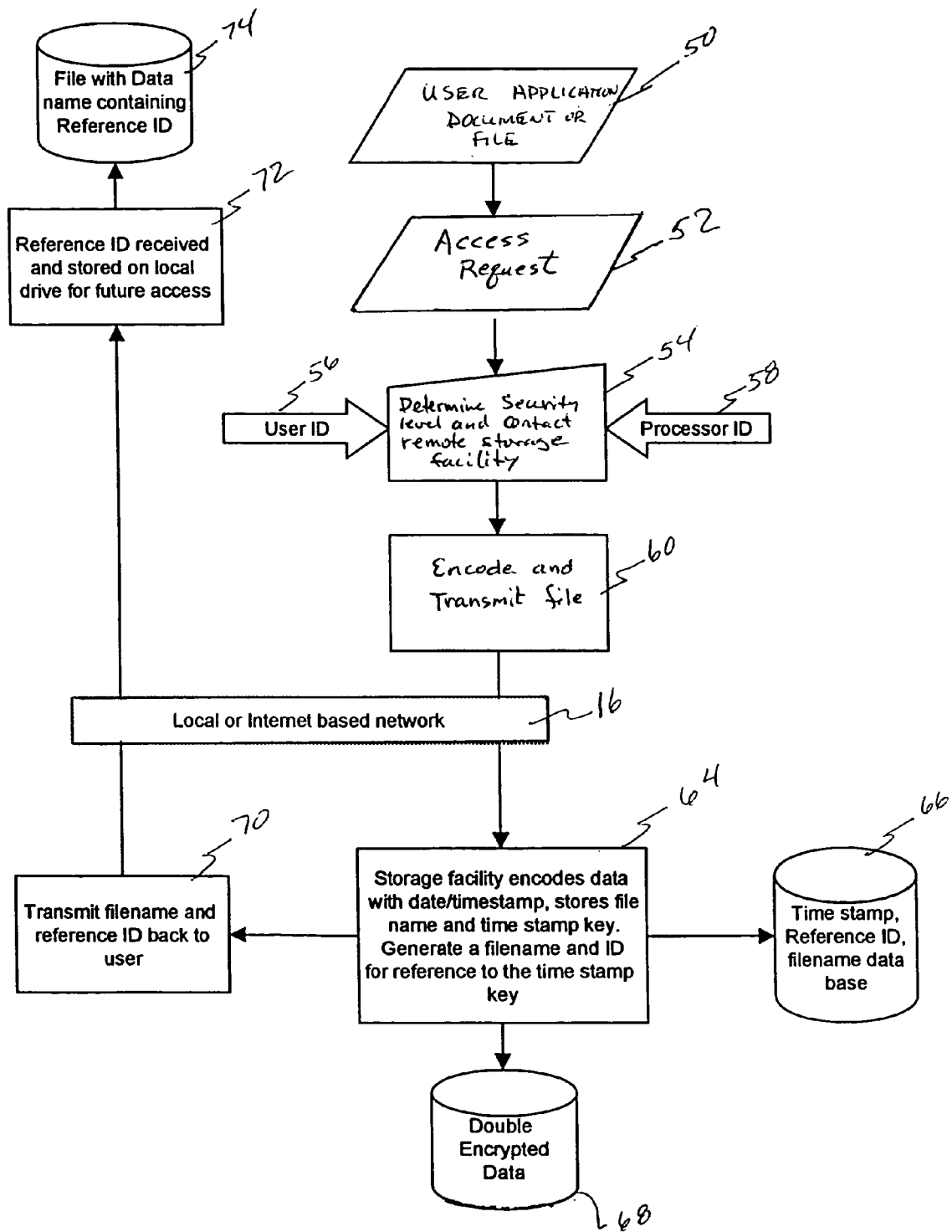
FIG. 3 is a flow chart illustrating storing a document in a secure document storage facility according to the principles of the present invention.

FIG. 3 is a flow chart illustrating the process for storing a data file in a dedicated data storage unit in a preferred embodiment of the secure data storage system in accordance with the principles of the present invention. A user working on a document or data file in a user application (50) such as a word processing application, for example, makes a decision to store that document or data file in secure storage. To save the document or data file, the user submits an access request (52) for access to an assigned dedicated data storage unit 20 (secure storage). To submit an access request, the user simply uses the "Save As" command conventionally provided by most user applications, specifying the logical storage device, the "d" drive, for example, and his or hers assigned user ID code for the first subdirectory in the path format for the data file to be stored in the dedicated data storage unit 20 assigned to that user ID code. Based on the user ID code 56, and alternatively, based on both the user ID code 56 and a processor ID code 58 (assigned to the client computer processor 26), the logical storage device controller 36 determines (54) the security level to be assigned to the particular data file and which user encryption key, if any, to use to encrypt the data file prior to transmitting the data file to the remote secure storage facility 14. Based on the logical storage device 34 designator 40 specified in the access request, the controller 36 also retrieves the remote secure storage facility 14 network address and initiates communications with the remote secure storage facility over the communications network 16. The controller 36 then performs any necessary formatting of the data file including the access request and adding any special instructions for the storage of the data file, such as the assigned security level, for example. The formatted data file is then encrypted, if required, and transmitted (60) over the communications network 16 to the remote secure storage facility 14.

Alternatively, when submitting an access request, the user would specify only the logical storage device, the "d" drive, for example, and the path elements 44 and 46 without specifying the user ID 42. The logical storage device controller 36 would then attach the appropriate user ID to the access request based on the user submitting the access request prior to transmitting the access request to the remote secure storage facility 14, thus making the user ID also transparent to the user. A user would be required to log on to the client computer 12 or to the user application 32 using a secure password, for example, in order for the logical storage device controller 36 to recognize the user submitting an access request.

At the remote secure storage facility 14, the system processor 22 identifies (64) the dedicated data storage unit 20 assigned to the user ID code specified in the access request and grants access to the identified dedicated data storage unit 20 in accordance with a set of instructions (provided by the user and the remote secure storage facility administrator at the time the service is subscribed) for that user ID code. Based on the assigned security level, either the user ID code or both the user ID code and the processor ID code may be required for the system processor 22 to grant access. The set of instructions specify security level for data files stored in the associated dedicated data storage unit 20, whether or not to provide additional encryption of the data file, level of access to be granted, etc. The system processor 22 then encrypts the data file as required with the remote secure storage facility encryption key 24 and stamps (i.e., adds to the file) the data file with the date and time. A filename and reference number (reference ID) is generated and the data file is stored (68) in the assigned dedicated data storage unit 20 identified by the user ID code specified in the access request. The date/time stamp, reference ID and filename are stored in a database (66) where a directory for the remote secure storage facility 14 is maintained by the system processor 22. The filename and reference ID is also transmitted (70) back to the client computer 12 via the communications network 16 and stored (72) in a local data base 74 where the logical storage device controller 36 maintains a directory for each of the user-assigned dedicated data storage units.

Figure 4:
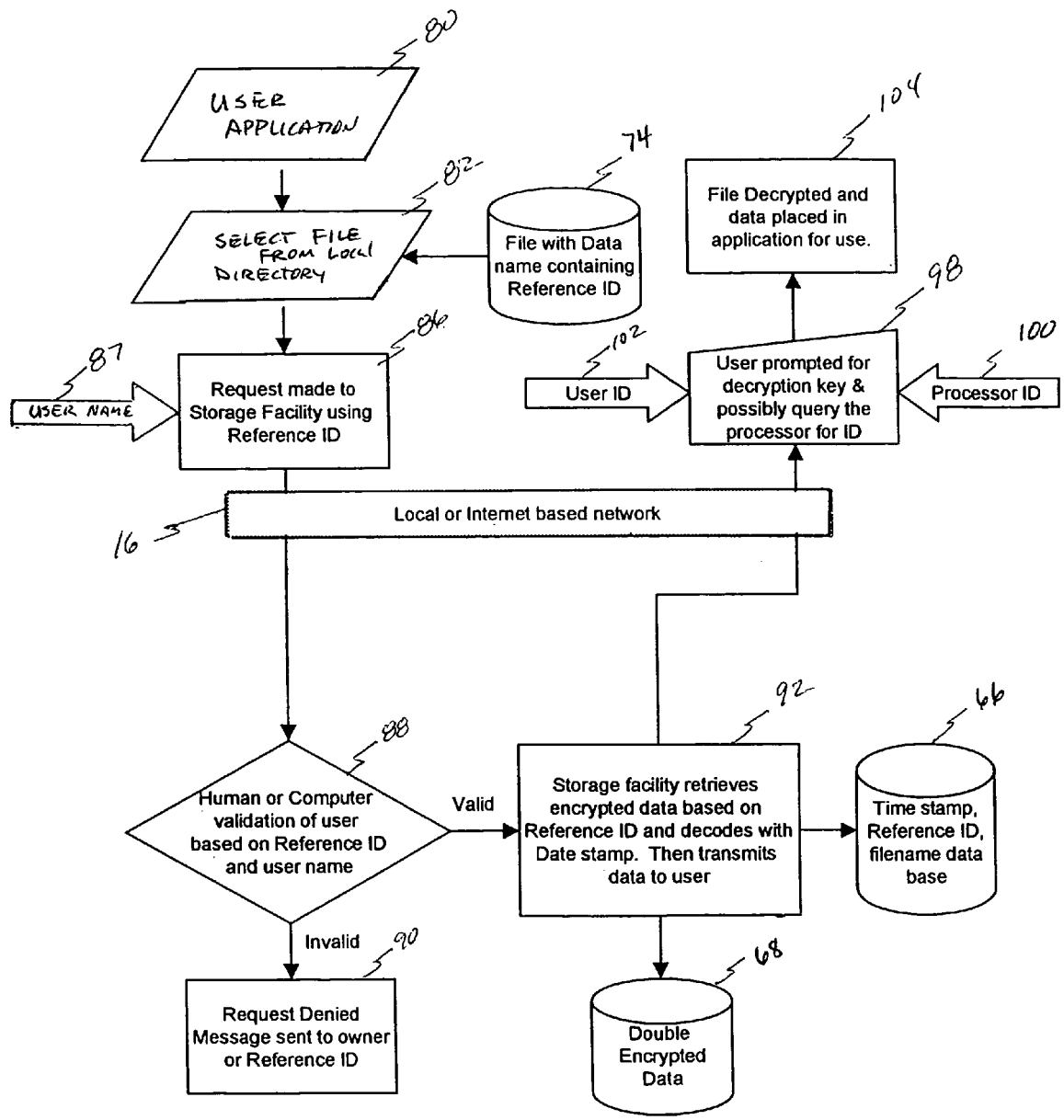
FIG. 4 is a flow chart illustrating retrieval of a document from a secure document storage facility according to the principles of the present invention.

FIG. 4 is a flow chart illustrating the process for retrieving a data file from a dedicated data storage unit in a preferred embodiment of the secure data storage system in accordance with the principles of the present invention. A user working (80) in a user application is required to retrieve a data file from secure storage (i.e., an assigned dedicated data storage unit 20). In a manner similar to that described with reference to FIG. 3, to submit an access request, the user simply uses the "open file" command conventionally provided by most user applications. When the list of drives is displayed, the user selects the logical storage device, the "d" drive, for example. This prompts the logical storage device controller 36 to retrieve from the database (74) and display the directory for the remote secure storage facility 14 indicated by the designator 40 for the logical storage device 36. The user selects (82) the appropriate subdirectory, designated by the user ID code, and the desired data file from the subdirectory. The filename includes the reference ID assigned by the system processor 22 when the data file was stored in the dedicated data storage unit 20 identified by the specified user ID code. When the user has specified the desired data file to be retrieved, the logical storage device controller 36 determines the network address and establishes communications with the remote secure storage facility 14 corresponding to the designator 40 for the logical storage device 34. Prior to transmitting the access request to the remote secure storage facility 14, the controller 36 prompts the user to enter the user name (87) and appends it to the access request. The controller 36 then transmits the access request to the remote secure storage facility 14 via the communications network 16 (86).

At the remote secure storage facility 14, utilizing the user name, the user ID code and the reference ID, the system processor 22 validates (88) that an authorized user is submitting the access request. If the user is not authorized, the access request is denied (90) and a message is sent to client computer 12 cross-referenced to the reference ID specified in the access request and to the owner of the service subscription. Alternatively, in a preferred embodiment, the validation process may be performed by human administrators rather than by the system processor 22; for example, a telephone call to a previously authorized phone number to validate the request. If the access request is valid (i.e., submitted by an authorized user) the system processor 22 grants access in accordance with the set of instructions associated with the specified user ID code, cross-references the specified reference ID with the filename database 66 and retrieves (92, 68) the desired data file. Using the decryption key 24, the retrieved data file is decrypted removing any encryption provided by the remote secure storage facility at the time the data was stored. The date/time stamp applied to the data file at the time of encryption is used to determine the proper decryption key to be used. The decrypted data file is then transmitted (92) back to the client computer 12 and the user via the communications network 16. If the processor ID was required by the assigned security level when the data file was originally stored, then the receiving computer, the client computer 12, will be prompted for its processor ID (100) prior to the system processor 22 transmitting the decrypted data file. If the processor ID (100) is not an authorized processor ID, the data file will not be transmitted and a message is sent to the client computer 12 and the subscription owner. At the receiving computer, the controller 36 decrypts the received data file with the user key to remove any encryption provided at the client computer 12 when the data file was originally transmitted to the remote secure storage facility 14 for secure storage. Similarly, the logical storage device controller 36 determines that the requesting user is an authorized user for the retrieved file prior to decrypting the data file. When decrypted and authorized, the user can then retrieve (104) the desired file from the logical storage device 34 for the application in use.

In the several preferred embodiments illustrated above, various functions have been described as being performed by either the logical storage device 34 and its controller 36 or the remote secure storage facility 14 and its system processor 22. It is to be noted that it is not mandatory that all of the described functions be assigned to the particular components as described above, but that many of these functions can be performed by either the logical storage device 34 and its controller 36 or the remote secure storage facility 14 and its system processor 22. For example, functions such as creating and deleting data files, writing to and reading from the data files can be performed by either the logical storage device controller 36 or the remote secure storage facility system processor 22. Similarly, the directory for the remote secure storage facility 14 may be maintained at the remote secure storage facility only and transmitted to a user for display at each instance an access request has been received and access to the specified dedicated data storage unit 20 has been granted.

It should also be noted that the remote secure storage facility 14 need not be physically located remote to the client computer 12, but that the secure data storage system 10 may be located entirely within a single computer system. For example, the remote secure storage facility 14 may be a secure magnetic disk drive coupled to a user application 32 and logical storage device 34 via a network 16 internal to the computer system. All of the functions of the system processor 22 being performed by the magnetic disk drive controller and encryption/decryption 24 services being provided by the computer system at the call of the magnetic disk drive controller.

In addition to the foregoing, the logic of the present invention can be implemented in hardware, software, firmware, or a combination thereof. In the preferred embodiment(s), the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate logic gates, a programmable gate arrays(s) (PGA), a field programmable gate array (FPGA), etc.

Also, the flow charts of FIGS. 3 and 4 show the architecture, functionality, and operation of a possible implementation of the logic. In this regard, each block represents a module, segment, or portion of code, which comprises one or more executable instructions for implementing the specified logical function(s). It should also be noted that in some alternative implementations, the functions noted in the blocks may occur out of the order noted in FIGS. 3 and 4. For example two or more blocks shown in succession in FIGS. 3 and 4 may in fact be executed substantially concurrently or the blocks may sometimes be executed in the reverse order, depending upon the functionality involved.

Finally, the logic which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM)(magnetic), a read-only memory (ROM)(magnetic), an erasable programmable-read-only memory (EPROM or Flash memory), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While having described and illustrated the principles of the present invention with reference to various preferred embodiments and alternatives, it will be apparent to those familiar with the art that the invention can be further modified in arrangement and detail without departing from those principles. Accordingly, it is understood that the present invention includes all such modifications that come within the terms of the following claims and equivalents thereof.

What is claimed is:

1. A secure data storage system, comprising:
   a communications network address configured to identify the secure data storage system to a remote computing device communicatively coupled to the secure data storage system via the communications network;
   a dedicated data storage unit configured to maintain data files generated by the remote computing device, the dedicated data storage unit identified by an identification code corresponding to the remote computing device; and
   a processing component configured to receive and process a request to access the dedicated data storage unit, the request being initiated as a directory path selection displayed such that the dedicated data storage unit appears as a local storage device of the computing device, the directory path specifying the communications network address, the identification code, and a data file maintained with the dedicated data storage unit.

2. A secure data storage system as recited in claim 1, wherein the identification code includes a processor identification code corresponding to the remote computing device.

3. A secure data storage system as recited in claim 1, wherein the identification code includes a user identification code and a processor identification code corresponding to the remote computing device.

4. A secure data storage system as recited in claim 1, wherein the processing component is further configured to grant access to the dedicated data storage unit in accordance with access instructions associated with the identification code.

5. A secure data storage system as recited in claim 1, wherein the processing component is further configured to encrypt the data files in accordance with a security level associated with the identification code.

6. A method, comprising:
   maintaining data files with a dedicated data storage unit that is identified by an identification code corresponding to a remote computing device, the dedicated data storage unit having an associated communications network address;
   receiving a request to access the dedicated data storage unit, the request being initiated as a directory path selection displayed such that the dedicated data storage unit appears as a local storage device of the remote computing device, the directory path specifying the communications network address, the identification code, and a data file maintained with the dedicated data storage unit; and granting access for the remote computing device to access the dedicated data storage unit in accordance with access instructions associated with the identification code.

7. A method as recited in claim 6, further comprising generating the identification code to include a processor identification code corresponding to the remote computing device.

8. A method as recited in claim 6, further comprising generating the identification code to include a user identification code and a processor identification code corresponding to the remote computing device.

9. A method as recited in claim 6, further comprising encrypting the data files in accordance with a security level associated with the identification code.

10. A method, comprising;
generating a request to access a logical data storage peripheral that corresponds to a remote secure data storage system which includes a dedicated data storage unit to maintain data files generated by a computing device, the dedicated data storage unit identifiable by an identification code that corresponds to the computing device;
receiving the request to access the logical data storage peripheral, the request being initiated as a directory path selection displayed such that the logical data storage peripheral appears as a local storage device of the computing device, the directory path specifying the logical data storage peripheral, the identification code, and a data file maintained with the dedicated data storage unit;
communicatively coupling the computing device to the remote secure data storage system; and
communicating the request to access the logical data storage peripheral to the remote secure data storage system.

11. A method as recited in claim 10, further comprising generating the identification code to include a processor identification code corresponding to the computing device.

12. A method as recited in claim 10, further comprising generating the identification code to include a user identification code and a processor identification code corresponding to the computing device.

13. In a computer system including at least one client computer coupled by a communications network to a remote secure storage facility located remotely to the client computer, a method of accessing a dedicated data storage unit for storing data files associated with a user identification code in a secure environment, the method comprising:
initiating a request for accessing a dedicated data storage unit of the remote secure storage facility, the request being initiated by selecting a directory path displayed such that the remote secure storage facility appears as a local storage device of the client computer, the directory path specifying at least the remote secure storage facility and a user identification code, the remote secure storage facility associated with an address on the communications network;
in response to the request, automatically connecting to the remote secure storage facility at the associated address;
transmitting the request to the remote secure storage facility;
identifying the dedicated data storage unit associated with the specified user identification code; and
granting access to the identified dedicated data storage unit.

14. The method as in claim 13 wherein the step of granting access includes granting access to the identified dedicated storage unit in accordance with pre-existing instructions associated with the specified user identification code.

15. The method as in claim 13 wherein the request further specifies a processor identification code associated with a client computer, the step of identifying the dedicated data storage unit including identifying the dedicated data storage unit associated with both the specified user identification code and the specified processor identification code.

16. The method as in claim 13 including the further step of displaying to a user a directory of data files stored in the dedicated data storage unit.

17. The method as in claim 16 including the further steps of:
selecting a data file from the displayed directory of data files; and
transmitting the selected data file to a client computer associated with the request.

18. The method as in claim 13 wherein each data file stored in the dedicated data storage unit has a predetermined security level assigned thereto, each data file being encrypted in accordance with its assigned security level.

19. The method as in claim 13 wherein the request further specifies at least one data file stored on the identified dedicated data storage unit, the method further comprising the step of transmitting the specified at least one data file to a client computer associated with the request.

20. The method as in claim 13 wherein each data file stored in the dedicated data storage unit is assigned a reference identification number by the secure storage facility at the time each data file is initially stored in the dedicated data storage unit.

21. The method as in claim 20 wherein each data file stored in the dedicated data storage unit is assigned a new reference identification number by the secure storage facility each time the data file is accessed by a user after being initially stored in the dedicated data storage unit.

22. The method as in claim 13 including the further steps of:
storing one or more data files in the dedicated data storage unit after access has been granted; and
encrypting the data in the one or more data files in accordance with a user assigned security level associated with each data file to be stored.

23. The method as in claim 22 wherein the step of encrypting the data includes the step of encrypting the data at the secure storage facility prior to storing the one or more data files in the dedicated data storage unit.

24. The method as in claim 23 wherein the step of encrypting the data includes the step of encrypting the data at a client computer associated with the request prior to storing the one or more data files in the dedicated data storage unit.

25. In a computer system including at least one client computer coupled by a communications network to a secure storage facility located remotely to the client computer, the remote secure storage facility identified by an address on the communications network and including at least one dedicated data storage unit for storing data files associated with a user identification code in a secure environment, encryption/decryption means and processor means, the remote secure storage facility adapted to allow access to the at least one dedicated data storage unit in accordance with a set of pre-existing instructions, apparatus for accessing the at least one dedicated data storage unit such that the remote secure storage facility is transparent to a client computer, the apparatus comprising:
- a logical data storage peripheral coupled to the client computer, the logical data storage peripheral associated with the remote secure storage facility; and
- a controller associated with the logical data storage peripheral and storing the address on the communications network of the remote secure storage facility, the controller including machine executed means for:
- receiving a request from a user on the client computer to access the logical data storage peripheral, the request being initiated by selecting a directory path displayed such that the remote secure storage facility appears as a local storage device of the client computer, the directory path specifying at least the logical data storage peripheral and a user identification code;
- determining the address of the specified secure storage facility;
- automatically connecting to the remote secure storage facility;
- transmitting the access request to the remote secure storage facility; and
- when access to a dedicated data storage unit associated with the specified user identification code has been granted, providing access to the dedicated data storage unit by routing communications between the client computer and the remote secure storage facility, the client computer unaware it is in communication with the remote secure storage facility.

26. Apparatus as in claim 25 further comprising encryption and decryption means for encrypting data files to be stored in a dedicated data storage unit and decrypting data files retrieved from a dedicated data storage unit.

27. Apparatus as in claim 26 wherein a data file to be stored in the dedicated data storage unit associated with a user identification code is encrypted in accordance with a user assigned security level.

28. Apparatus as in claim 25 further comprising memory means for storing at least one directory, each directory containing a listing of data files stored in a dedicated data storage unit.

29. A computing device, comprising:
- a logical data storage peripheral corresponding to a remote secure data storage system that includes a dedicated data storage unit configured to maintain data files generated by the computing device, the dedicated data storage unit identified by an identification code corresponding to the computing device;
- a controller configured to receive a request to access the logical data storage peripheral, the request being initiated as a directory path selection displayed such that the logical data storage peripheral corresponding to the remote secure data storage system appears as a local storage device of the computing device, the directory path specifying the logical data storage peripheral, the identification code, and a data file maintained with the dedicated data storage unit; and
- the controller further configured to communicatively couple the computing device to the remote secure data storage system and communicate the request to access the logical data storage peripheral to the remote secure data storage system.

30. A computing device as recited in claim 29, further comprising a processor configured to execute the controller, and wherein the identification code includes a processor identification code corresponding to the computing device.

31. A computing device as recited in claim 29, further comprising a processor configured to execute the controller, and wherein the identification code includes a user identification code and a processor identification code corresponding to the computing device.

32. A secure storage facility having an address on a communications network and adapted for communication with other devices on the communications network, the secure storage facility comprising:
- one or more dedicated data storage units for storing data files in a secure environment, each of the dedicated data storage units identified by at least one user identification code; and
- a processor coupled to each of the dedicated data storage units, the processor including machine executed means for:
- receiving an access request from a user on a remotely located client computer, the access request being initiated as a directory path selection displayed such that the secure storage facility appears as a local storage device of the client computer, the directory path specifying at least a user identification code;
- identifying a dedicated data storage unit associated with the specified user identification code; and
- granting access to the identified dedicated data storage unit in accordance with a set of instructions associated with the specified user identification code.

33. A secure storage facility as in claim 32 further comprising encryption and decryption means for encrypting and decrypting data files associated with a user identification code in accordance with the set of instructions associated with the user identification code.

34. A secure storage facility as in claim 33 wherein a data file to be stored in the dedicated data storage unit associated with a user identification code is encrypted in accordance with a user assigned security level.

35. A secure storage facility as in claim 32 wherein the set of instructions associated with a user identification code specifies read-only, write-only or read/write access to data files stored in the dedicated data storage unit associated with that user identification code.

* * * * *